July 12, 1966 J. LUESCHER ET AL 3,260,901

SEMI-CONDUCTOR DEVICE HAVING SELF-PROTECTION AGAINST OVERVOLTAGE

Filed March 8, 1962 2 Sheets-Sheet 1

July 12, 1966 J. LUESCHER ET AL 3,260,901

SEMI-CONDUCTOR DEVICE HAVING SELF-PROTECTION AGAINST OVERVOLTAGE

Filed March 8, 1962 2 Sheets-Sheet 2

3,260,901

United States Patent Office

Patented July 12, 1966

3,260,901
SEMI-CONDUCTOR DEVICE HAVING SELF-PROTECTION AGAINST OVERVOLTAGE

Jakob Luescher and Bogdan Zega, both of Geneva, Switzerland, assignors to Compagnie Generale d'Electricite, Paris, France, a firm Filed Mar. 8, 1962, Ser. No. 178,351
Claims priority, application Switzerland, Mar. 10, 1961, 2,880/61
6 Claims. (Cl. 317—235)

The present invention relates to a semi-conductor device having self-protection against overvoltage, which comprises at least three junctions each between two semi-conductor layers of opposite types of conduction.

As is known, semi-conductor devices comprising more than one semi-conductor junction, i.e. more than one junction between two semi-conductor layers of opposite types of conduction, such as, for example, semi-conductor recifiers, have the disadvantage that they are not resistant to an inverse overvoltage, because, in contrast to what happens with a forward overvoltage after the disruption which it has produced, an inverse overvoltage retains its value after the disruption, so that the power dissipated in the rectifier becomes such that the latter is immediately destroyed. The thermal time constant of such devices is very small, and the disruption current would therefore have to be interrupted with a rapidity which it is substantially impossible to attain with electromechanical circuit breakers. The solution consisting in protecting such devices by similar devices connected in anti-parallel has the disadvantage that it is costly and renders the circuit very complex.

The invention has for its object to obviate the aforesaid disadvantage of existing semi-conductor devices and proposes a device for self-protection against an overvoltage. This device is distinguished from the known devices by the fact that each of the outermost junctions is a junction between a degenerate semi-conductor layer and a semi-conductor layer whose doping in the neighbourhood of the junction is such that the junction has very low electrical resistance when it is inversely biased.

Two embodiments of the subject of the invention, and a number of operating characteristics, are diagrammatically illustrated by way of example in the accompanying drawings.

FIGURE 1 shows in section a device consisting of four semi-conductor layers $P_1N_1P_2N_2$, for example of monocrystalline silicon, forming three junctions 1, 2 and 3.

Figure 2:
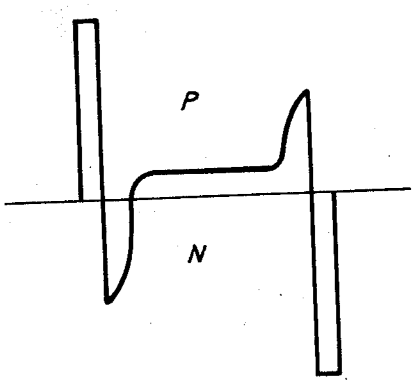
FIGURES 2 and 6 illustrate, respectively, the doping diagrams of the various layers of the devices of FIGURES 1 and 5.

FIGURE 2 is a diagram illustrating the doping of the various layers. As will be seen, the layers $P_1$ and $N_2$ are thin layers which are very highly doped in such manner as to be degenerated. This is effected by such doping that the Fermi level is situated in the valence band of the layer $P_2$ and in the conduction band of the layer $N_2$, respectively.

The layer $N_1$ is also a thin layer which has been highly doped in such a manner that the lower level of its conduction band in the neighbourhood of the junction 1 coincides with the Fermi level.

The layer $P_2$ is a thicker layer than the others and is weakly doped, except in the neighbourhood of the junction 3, where its doping is such that the upper level of its valence band coincides with the Fermi level.

It is also essential that the concentration gradient of the impurities at the junctions 1 and 3 should be very large in order that the barriers created by the potential difference due to the thermal balance may be very narrow. In the case of silicon, this thickness is of the order of 100 A.

Figure 3:
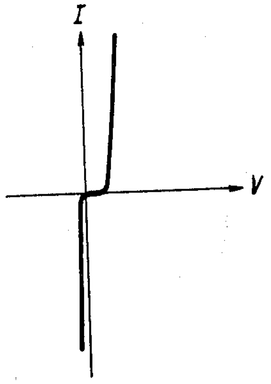
FIGURES 3, 4 and 7 illustrate a number of operating characteristics.

It will thus be seen from the foregoing that each of the two extreme junctions 1 and 3 is a junction between a highly degenerate semi-conductor layer and a semi-conductor layer in which the upper level of the valence band and the lower level of the conduction band, respectively, coincide with the Fermi level. Now, it is known that such a junction has characteristics of a so-called "backward rectifier," that is to say, that when biased in the forward direction it behaves as a normal semi-conductor junction, and when biased in the inverse direction it behaves as a very low electrical resistance substantially equivalent to a short circuit. FIGURE 3 shows the V-I characteristic of a backward rectifier.

Figure 4:
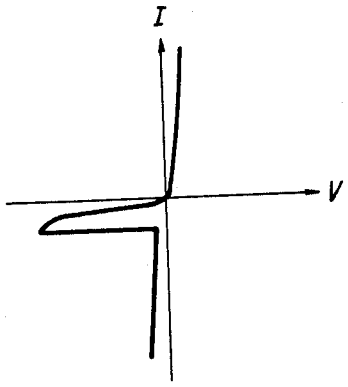

The above-described device operates as follows:

It will be assumed that the device is connected to a D.C. voltage source, the electrode 5 being connected to the negative pole and the electrode 6 to the positive pole of the said source. The junctions 1 and 3 are therefore biased in the inverse direction and the junction 2 in the forward direction. The junctions 1 and 3 therefore behave as ohmic contacts and the junction 2 as a semi-conductor junction biased in the forward direction. By injection of electrons from the layer $N_1$ and of holes from the highly doped portion of the layer $P_2$ into the latter, its conductivity is modulated and its resistance to direct current is consequently greatly reduced. The device therefore behaves in the conductive state as a simple semi-conductor rectifier of the PIN type, in which P is the highly doped portion of the layer $P_2$ and I the weakly doped portion of $P_2$, subjected to a direct voltage. The upper portion of FIGURE 4 shows the corresponding V-I characteristic.

It will now be assumed that the electrode 5 is connected to the positive pole and the electrode 6 to the negative pole of the source. The junctions 1 and 3 are therefore biased in the forward direction and the junction 2 in the inverse direction. A barrier will thus be formed at the junction 2 and will determine the disruptive voltage of the device.

Figure 1:
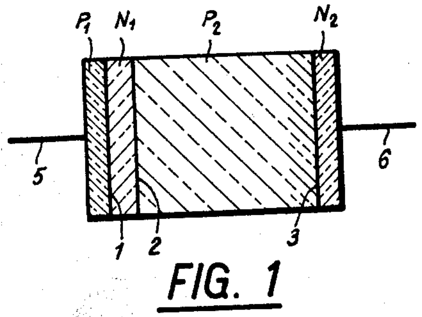
FIGURE 1 illustrates in section a first embodiment of the device.

It will readily be seen that in this case the operation of the device will correspond to that of a four-layer rectifier of the PNPN type subjected to a D.C. voltage and in which $P_1N_1P_2$ and $N_2P_2N_1$ may be regarded as two complementary transistors. When the D.C. voltage reaches the value of the disruptive voltage, the rapid increase of the current will result in a reduction of the voltage as shown by the lower portion of FIGURE 4. It will therefore be apparent from the V-I characteristic of the device illustrated in FIGURE 1 that this device may be employed as a rectifier which protects itself against an inverse overvoltage. It is to be noted that the disruptive voltage may be controlled, for which purpose it is merely sufficient to provide the layer $N_1$ with an electrode and to connect the latter to a control voltage.

The device hereinbefore described may be obtained, for example, by diffusing boron into one of the faces of a monocrystalline silicon wafer of weakly doped P type, so as to obtain a layer having on its surface a doping of at least $5.10^{19}$ atoms/cc. Phosphorus is diffused into the other face of the wafer so as to obtain a layer of N type also having in its upper surface a doping higher than $5.10^{19}$ atoms/cc. There is thereafter formed, for example by alloying, in each of the two outer layers a highly degenerate layer of the opposite type of conduction, that is to say, a layer whose doping is at least $10^{20}$ atoms/cc., in such manner that the junctions 1 and 3 are situated at the depth at which the concentration of the impurities in the layers $N_1$ and $P_2$ is about $5.10^{19}$ atoms/cc.

Figure 5:
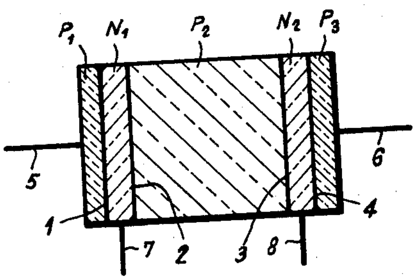
FIGURE 5 is a section through a second embodiment of the device.
Figure 6:
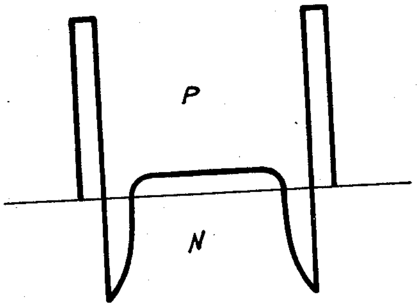

FIGURE 5 illustrates another embodiment of the device according to the invention. This device comprises five layers $P_1N_1P_2N_2P_3$ and four junctions 1 to 4. As is shown by the doping diagram of FIGURE 6, the layers $P_1$, $N_1$ and $P_2$ are identical to those of the device illustrated in FIGURE 1, except that the layer $P_2$ is weakly doped throughout its thickness. The layers $N_2$ and $P_3$ are identical to the layers $N_1$ and $P_1$ respectively. The junctions 1 and 4 are therefore junctions having characteristics of a backward rectifier and the junctions 2 and 3 have normal characteristics.

It will readily be seen that the V-I characteristic of this device will be the same for both directions of the current and identical to that of a four-layer rectifier subjected to a direct current.

Figure 7:
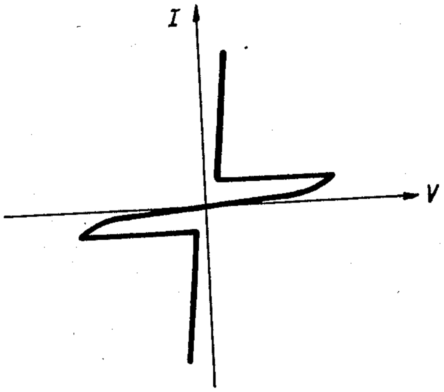

Owing to the special characteristics of the two outermost junctions 1 and 4, the device of FIGURE 5 may be regarded as a four-layer rectifier of the PNPN type, for each of the two directions of the current, as is shown by its V-I characteristis illustrated in FIGURE 7.

It is obvious that the instant at which the device changes over into its state of high conductance may be controlled in each of the two directions. It will merely be necessary for this purpose to provide either one of the two layers $N_1$ and $N_2$ with an electrode 7 or 8 respectively, similar to the electrodes 5 and 6, and to connect it to a control voltage of appropriate polarity.

It will thus be apparent that the device according to FIGURE 5 may be employed as a rectifier controlled for both directions of the current, which is capable of protecting itself against an overvoltage in both directions.

A PNPNP device as hereinbefore described may be obtained from a monocrystalline silicon wafer of P type by diffusing phosphorus symmetrically into both sides so as to obtain the two junctions 2 and 3. The surface concentration must be higher than $5.10^{19}$ in order that there may thereafter be formed, for example by alloying, two extreme layers $P_1$ and $P_3$ having a concentration higher than $10^{20}$ atoms/cc., in such manner that the junctions 1 and 4 are situated at the point where the concentration of the impurities in the layers $N_1$ and $N_2$ is about $5.10^{19}$ atoms/cc.

The devices described and illustrated by way of example are PNPN and PNPNP devices, but it will be understood that NPNP and NPNPN devices may also be provided. On the other hand, the layer $P_2$ could be a layer of an intrinsic semiconductor instead of a weakly doped layer. Finally, germanium or another monocrystalline semi-conductor body could, of course, be employed for these devices.

What is claimed is:

1. A semiconductor device having self-protection against over-voltage, comprising four layers of monocrystalline material of alternately opposite conductivity type forming two outer p-n junctions and an inner p-n junction, the outer two of said layers being degenerate layers and the outer two junctions being relatively thin junctions, one of the inner two of said layers having a relatively weak conductivity type determining impurity concentration adjacent to said inner junction and having an increased conductivity type determining impurity concentration at least approaching degeneracy adjacent to one of said outer junctions, and the other of said inner layers having a conductivity type determining impurity concentration of a lower value than degeneracy adjacent to said inner junction and increasing at least to approach degeneracy adjacent to the other of said outer junctions.

2. A semiconductor device as set forth in claim 1, wherein said one of the inner two of said layers is relatively thick and the others of said layers are relatively thin, a major one end portion of said thick inner layer terminating adjacent to said inner junction and having said relatively weak conductivity type determining impurity concentration, and a minor opposite end portion of said thick inner layer terminating adjacent to said one of said outer junctions and having said conductivity type determining impurity concentration approaching degeneracy adjacent to said one of said outer junctions.

3. A semiconductor device as set forth in claim 1, comprising a control electrode electrically connected with said other of said inner layers.

4. A semiconductor device having self-protection against over-voltage, comprising five layers of monocrystalline material of alternately opposite conductivity type forming two outer p-n junctions and two inner p-n junctions, the outer two of said layers being degenerate layers and the outer two of said junctions being relatively thin junctions, one of said inner layers having a relatively weak conductivity type determining impurity concentration from the region of one of said inner junctions to the region of the other of said inner junctions, and the other two of said inner layers each having a conductivity type determining impurity concentration of lower value than degeneracy adjacent to the related inner said junction and increasing at least to approach degeneracy adjacent to the related one of said outer junctions.

5. A semiconductor device according to claim 4, characterized by said one of said inner layers being a relatively thick layer and by the others of said layers being relatively thin layers.

6. A semiconductor device as set forth in claim 4, characterized by at least one of said other two of said layers having electrically connectedly a control diode.

References Cited by the Examiner

UNITED STATES PATENTS

| | | | |
|---|---|---|---|
| 2,869,084 | 1/1959 | Shockley | 317—235 |
| 2,983,854 | 5/1961 | Pearson | 317—235 |
| 3,046,459 | 7/1962 | Anderson et al. | 317—234 |
| 3,119,026 | 1/1964 | Dorendorf et al. | 317—234 |

JAMES D. KALLAM, *Acting Primary Examiner.*

JOHN W. HUCKERT, *Examiner.*

J. A. ATKINS, *Assistant Examiner.*